July 24, 1951  P. H. GRANBERRY  2,561,980
SAND PLUG OR SAFETY VALVE FOR WELLS
Filed May 13, 1949
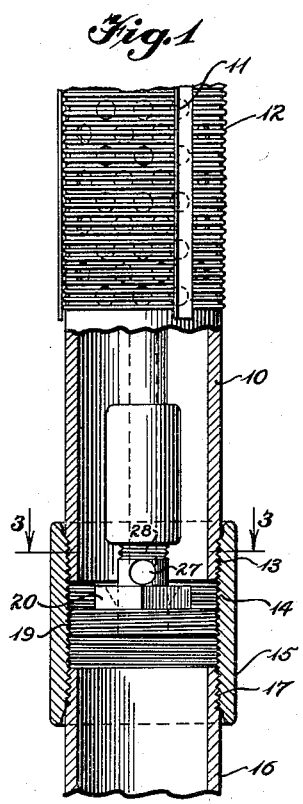
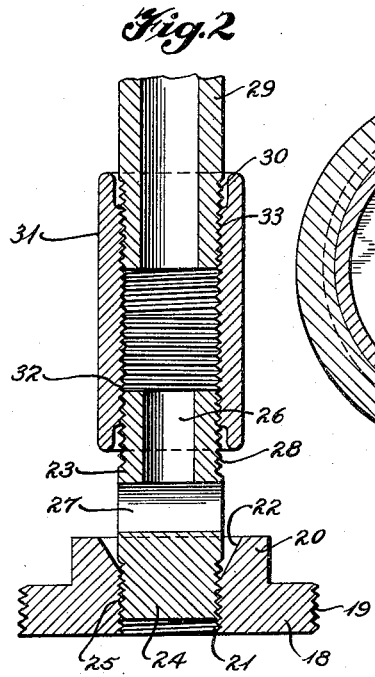
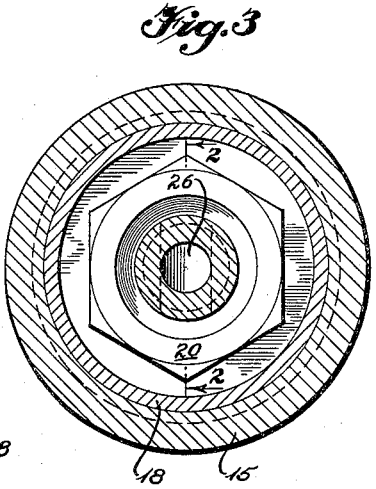
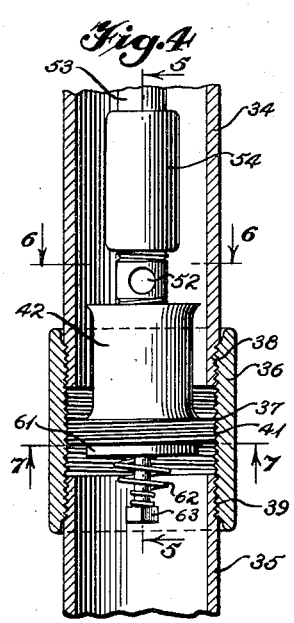
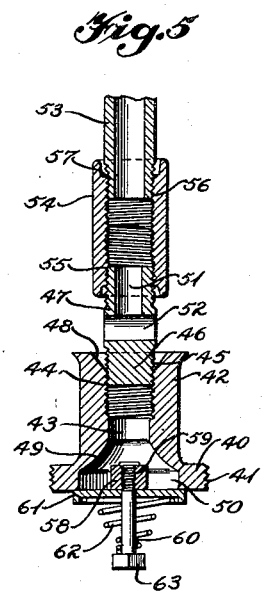
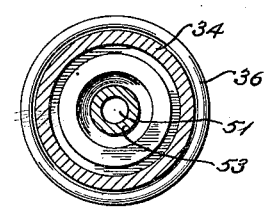
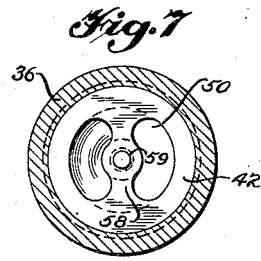
INVENTOR.
Pat H. Granberry
BY
Cushman Darby Cushman
Attorneys

Patented July 24, 1951

2,561,980

UNITED STATES PATENT OFFICE 2,561,980

SAND PLUG OR SAFETY VALVE FOR WELLS

Pat H. Granberry, De Ridder, La.

Application May 13, 1949, Serial No. 93,040

1 Claim. (Cl. 166—20)

The present invention relates to an improved strainer attachment for wells.

An important object consists in associating with the lower end of a well strainer or screen tubing, a safety valve for insuring a positive seal being provided at the bottom of the strainer tubing when the latter is inserted in a well and after the drilling operation has been completed, so as to acquire all liquid introduced into the tubing to first pass through the strainer so as to remove sand, grit and other foreign matter therefrom.

A further object is to provide a well strainer or tubing with a strainer valve designed to be used in conjunction with a conventional spring pressure valve so as to prevent fluid from passing up through the tubing when the latter is being lowered into a well, and which also will require all water coming into the well to pass through the strainer so as to separate foreign matter from the water so that when the drilling mud and fluid is washed out of the well by the application of pump pressure at the upper end of the strainer pipe, any pebbles or large grains of sand that might collect or adhere to the bottom of the pressure valve, and cause it to remain open, will be prevented from passing back inside of the pipe strainer due to the fact that the valve plug will cut off the flow of such supply and will require all fluid to pass first through the strainer before being introduced into the pipe.

Another object is to provide a sand plug or strainer plug valve with means so that fluid under pressure may be introduced into the strainer tubing, should for any reason sand, sediment or foreign matter collect at the bottom of the strainer and resist the movement of the plug valve into sealing engagement with its seat.

Other objects and advantages of the invention will become apparent from the following description when taken in conjunction with the accompanying claim and drawings.

Referring to the drawings in which are shown several preferred embodiments of the invention:

Figure 1 is a side view with parts in section of the improved strainer attachment.

Figure 2 is a detail sectional view taken substantially along the line 2—2 of Figure 3.

Figure 3 is an enlarged sectional view taken substantially along the line 3—3 of Figure 1.

Figure 4 is a side elevational view of parts in section of a modified form of the invention.

Figure 5 is a sectional view taken substantially along the line 5—5 of Figure 4.

Figure 6 is a sectional view taken substantially along the line 6—6 of Figure 4, and Figure 7 is a sectional view taken substantially along the line 7—7 of Figure 4.

Referring to the drawings in which like numerals indicate like parts in the several views, the strainer attachment includes a well tubing or pipe 10 (Fig. 1) provided in the upper portion thereof with openings 11 around which are preferably wrapped wire 12 to provide a strainer for preventing gritty fluid, sand or sediment from being introduced from the well bore into the pipe 10 when the latter is inserted into a well after the hydraulic drilling operation has been completed. The lower end portion of the pipe 10 is externally threaded as at 13 so as to receive the complementary internal threads 14 on the coupling member or sleeve 15. A tubular bottom member or nipple 16 has its upper end portion externally threaded as at 17 so as to engage the threads on the coupling 15 in order to firmly but detachably connect the strainer pipe 10 to the bottom or nipple member 16. A cylindrical closure member or cap 18 (Fig. 2) has its outer periphery externally threaded as at 19, and is of such a diameter as to be connected to the coupling threads 14 between the connection of the pipe 10 and the bottom member 16 therewith (Fig. 1). The closure member 18 is preferably formed with an upwardly extending polygonal shaped reduced portion or head 20 for receiving a suitable tool, so as to connect or remove the closure 18 from the coupling 15. The plug 18 and the head 20 are formed with a centrally disposed right-hand threaded opening 21 which, at its upper end, is preferably flared outwardly as at 22 for a purpose subsequently to be described.

A sand plug valve 23 is arranged to be insertable in the strainer tubing and has a solid lower end portion 24 which is externally threaded as at 25 and has its threads of the same pitch as the threads 21 of the closure member 18. Above the solid portion 24, the plug 23 has an axially disposed opening 26 which communicates with a transverse or radial through opening 27 adjacent the solid portion 24. The upper end of the valve plug 23 has an externally threaded portion 28, the threads of which are pitched opposite to that of the threads 25 and, as shown, are left-hand threads as contrasted to the right-hand threads 25. A hollow rotatable operating rod or pipe 29 (Fig. 2) is arranged to extend axially into the well bore and has its lower end portion formed with external threads 30 preferably of right-hand pitch. A coupling or sleeve 31 is arranged to detachably connect the operating rod 29 to the valve plug 23 and, as shown, the coupling or connecting member 31 has the bore thereof provided with left-hand threads 32 in the lower end thereof and with right-hand threads 33 in its upper end. Thus, it will be seen that the coupling member 31 may be detachably connected to the threads 28 on the plug 23, while the threads 33 of the coupling may be releasably secured to the threads 30 on the operating rod 29.

As shown, the plug 23 provides a sand plug valve and the closure member 18 is arranged to be secured to the coupling 15 between the two pipe members 10 and 16 (Fig. 1), so as to be securely retained in place and cannot be removed after the coupling 15 is tightened and the parts assembled. The sand plug valve is so constructed and arranged as to insure a positive seal between the strainer tubing or pipe 10 and the bottom tubular member or nipple 16 when the attachment is inserted in a well that has previously been hydraulically drilled.

In operation, the closure member 18, which constitutes a valve seat, is placed in position on the coupling 15 between the pipe members 10 and 16 but without the plug valve 23 being connected thereto and while the well bore is still full of drilling mud. The strainer attachment, as thus assembled, is then lowered in the well until the proper sand is reached. The drilling mud is now washed out of the well by pumping clear water down into the strainer tubing 10 so as to pass through the opening 21 in the closure 18 and through the nipple 16. This operation is continued until the mud is removed from the sand. Before starting to pump the well, the sand plug valve 23 is connected to the operating rod 29 by the coupling 31 and is inserted into the well and the strainer pipe 10. When the plug 23 comes in contact with the inclined or tapered side 22 of the closure 18, it will be moved into proper alignment with the threaded opening 21 so that upon rotating the rod 29 to the right or clockwise, the plug 23 is screwed into the opening or seat 21 and when the plug is firmly tightened, the left-hand threads 28 on the upper end thereof will start to unthread and cause the coupling 31 to back off so as to leave the plug 23 in sealing engagement with its seat on the closure 18, thus providing a tight seal in the bottom of the well that will require all water coming into the strainer to first be strained and removed from the sand, sediment or other foreign matter by passing between the wire 12 and through the openings 11 before being introduced into the tubing 10.

The valve plug 23 is formed with the axial passage 26 and the branch passage 27 so that in case sand or sediment collects in the bottom of the strainer sufficiently to resist the plug being moved downwardly into engagement with its seat on the closure member 18, means are provided whereby water or air may be pumped down into the strainer tubing so as to wash away the sand or sediment and thus allow the valve 23 to be seated on the closure 18 so as to seal the well.

In the modified forms of the invention disclosed in Figures 4 and 5, the strainer is substantially similar to that previously described and has associated with it a conventional spring pressure valve. As shown, the strainer tubing or pipe 34 is connected to a tubular bottom member or nipple 35 by a coupling 36 which is interiorly threaded as at 37 to receive the complementary threaded end portions 38 and 39 on the pipe 34 and tubular member 35, respectively. A cylindrical closure member or cap 40 is externally threaded as at 41 so as to engage the threads 37 on the coupling 36 when the parts are assembled. The closure member 40 is provided with an upwardly extending boss or reduced portion 42 and has a central through opennig 43, the upper wall of which is provided with right-hand threads 44 (Fig. 5) arranged to receive the complementary formed threads 45 on the lower solid portion 46 of the plug valve 47. The upper wall of the opening 43 is preferably flared as at 48 and the lower end portion of the wall 43 may be similarly flared as at 49 so as to terminate in the enlarged annular portion 50. The valve plug 47 is formed with the axial passage 51 and the branch radial passage 52 which are positioned above the solid portion 46. A tubular operating rod 53 is detachably connected to the safety valve 47 by the coupling or sleeve 54, the bore of which has a lower left-hand threaded portion 55 engaging the complementary threaded portion of the valve 47. The upper threaded portion 56 of the coupling bore has right-hand threads which engage complementary threads 57 on the lower end of the rod 53, so that the strainer valve 47 may be connected and permanently secured to the closure plug 40 in substantially the same manner as the sand plug valve 23 previously described.

The closure member 40 has a transverse bottom web 58 (Fig. 7) extending across the enlarged opening 50 and provided with a central threaded opening 59 (Fig. 5) which receives a threaded bolt 60. A displaceable closure disk or member 61 has the bolts 60 extending centrally therethrough and is arranged to be yieldably urged against the bottom of the member 40 to close the opening 50 by a coil spring 62 confined between the disk 61 and the head 63 of the bolt 60. It will be seen that the disk 61 constitutes a spring pressure valve associated with the strainer valve 47 so that when the strainer is in use, the fluid cannot flow up fast into and through the string of tubing 34 when the attachment is being lowered or inserted into the well.

In operation, after the well is drilled and the hole is full of mud and the depth of water bearing strata is determined, the closure member 40 is connected to the coupling sleeve 36 adjacent the bottom of the strainer and sufficient pipe is attached to the upper end of the strainer, so that the string of tubing may be lowered into the well until the strainer reaches the water bearing strata. The spring pressure valve 61 will now operate to close the opening 50 and preclude the water or fluid passing up from the nipple 35 into the pipe 34 during the lowering operation. Fresh water is now pumped into the tubing from the upper end thereof until all mud is washed out from inside of the pipe and backed up on the outside of the pipe adjacent the bottom of the well. After this washing operation is completed and the well is ready to produce oil or water, plug valve 47 is connected through the coupling 54 with the tubular operating rod 53 and is introduced into the well so that clockwise rotation causes the threads 44 on the lower solid portion 46 of the valve to be brought and maintained in firm sealing engagement with the threads on the wall of the valve seat opening 43. Continued rotation of the operating member 29 and the valve plug 47 in this direction will release the threaded engagement of the coupling 54 with the valve 47, so that the coupling may be moved back off of the valve without disturbing the tight sealing engagement of the plug with its valve seat.

It will be seen that the spring pressure valve.

61, when associated with the strainer valve 47, will insure a positive seal being provided and will preclude pebbles, shale or sand from interfering with the closing of the valve 61 which heretofore has interfered with the efficient operation of valves of this type.

The plug valves 23 and 47, it will be observed, are not initially positioned within the strainer tubing and each has a solid lower stem portion movable into sealing engagement with its valve seat, so as to remain in this closed position and cut off the upward flow of the liquid into the strainer above the closure member 20 or 40. In other words, the plug valve is substantially different in construction and operation from the hollow stem type of well valve that is opened and closed by a port through the center and which, when the port is moved above the seat, opens the valve while closing the same when the port is moved below the seat. The upwardly and outwardly flared portions of the closure members 18 and 20 constitute guide means for insuring their associated plug valves being properly moved into threaded engagement with the seat openings so as to facilitate the efficient operation of the valve assembly. This valve can be used as an additional safety factor in conjunction with ball-type floating check valves or spring valves.

It will be understood that the forms of the invention shown and described are merely illustrative of preferred embodiments and that such changes may be made as fall within the scope of the following claim.

I claim:

A strainer attachment for wells including a tubing having strainer openings in the wall thereof, a closure member connected to the bottom of the tubing and having a centrally disposed threaded opening forming a valve seat, a plug valve insertable in said tubing for engaging permanently said valve seat, said plug valve having a solid lower end portion provided with external threads pitched in the same direction as the threads in said central opening, said plug having an axial passage above the solid portion and extending to the opposite end thereof and a transverse passage above the solid portion communicating with said axial passage, said plug having an externally threaded portion extending above said transverse passage, and a coupling sleeve having its bore provided with a lower threaded portion having the same pitch as the external threads on the upper portion of said plug, the upper end portion of said bore having threads pitched opposite to the threads on the lower end portion of the bore, and a tubular rotatable operating rod insertable axially into said tubing, said rod having an externally threaded lower end portion provided with threads of the same pitch as the threads on the upper end portion of the coupling so as to engage the same, the parts being constructed and arranged so that upon inserting the rod with the plug connected to the lower end thereof through the coupling sleeve into the tubing and rotating and moving the rod axially, the plug is brought into threaded engagement with the valve seat opening in the closure member and upon continued rotation in the same direction the plug is forced into permanent sealing engagement with the valve seat while the threaded connection of the plug with the rod is simultaneously unthreaded to disconnect the coupling from the plug so that the latter provides an unremovable seal at the bottom of the well and requires all water coming into the tubing to pass first through the strainer openings, the passages in said plug providing means for introducing fluid under pressure into the strainer attachment so as to remove any sand or sediment that collects in the strainer and would resist the insertion of the plug valve into sealing engagement with its seat.

PAT H. GRANBERRY.

REFERENCES CITED

The following references are of record in the file of this patent:

UNITED STATES PATENTS

| Number | Name | Date |
|---|---|---|
| 1,594,303 | Keown et al. | July 27, 1926 |
| 1,596,260 | Thomson | Aug. 17, 1926 |
| 1,685,971 | Adams | Oct. 2, 1928 |
| 1,810,757 | Cunningham | June 16, 1931 |